(12) United States Patent
Murashige et al.

(10) Patent No.: US 12,325,656 B2
(45) Date of Patent: Jun. 10, 2025

(54) METHOD OF MANUFACTURING GLASS FILM

(71) Applicant: Nitto Denko Corporation, Ibaraki (JP)

(72) Inventors: Takeshi Murashige, Osaka (JP); Satoru Koshio, Osaka (JP)

(73) Assignee: NITTO DENKO CORPORATION, Ibaraki (JP)

( * ) Notice: Subject to any disclaimer, the term of this patent is extended or adjusted under 35 U.S.C. 154(b) by 356 days.

(21) Appl. No.: 17/631,956

(22) PCT Filed: Jul. 31, 2020

(86) PCT No.: PCT/JP2020/029534
§ 371 (c)(1),
(2) Date: Feb. 1, 2022

(87) PCT Pub. No.: WO2021/024955
PCT Pub. Date: Feb. 11, 2021

(65) Prior Publication Data
US 2022/0289616 A1    Sep. 15, 2022

(30) Foreign Application Priority Data
Aug. 5, 2019 (JP) .................................. 2019-143951

(51) Int. Cl.
*C03B 33/023* (2006.01)
*C03B 33/09* (2006.01)
*C03C 15/02* (2006.01)

(52) U.S. Cl.
CPC ........ *C03B 33/0235* (2013.01); *C03B 33/091* (2013.01); *C03C 15/02* (2013.01)

(58) Field of Classification Search
None
See application file for complete search history.

(56) References Cited

U.S. PATENT DOCUMENTS

| | | | |
|---|---|---|---|
| 2011/0195254 A1 | 8/2011 | Han et al. | |
| 2011/0223386 A1 | 9/2011 | Tomamoto et al. | |
| 2013/0129987 A1* | 5/2013 | Mitsugi | ................... C03B 17/06 428/192 |
| 2013/0134199 A1 | 5/2013 | Cavallaro, III et al. | |

(Continued)

FOREIGN PATENT DOCUMENTS

| | | |
|---|---|---|
| CN | 102442763 A | 5/2012 |
| JP | 2007238418 A | 9/2007 |

(Continued)

OTHER PUBLICATIONS

Extended (Supplementary) European Search Report dated Sep. 1, 2022, issued in counterpart EP Application No. 208050567.7. (6 pages).

(Continued)

*Primary Examiner* — Lisa L Herring
(74) *Attorney, Agent, or Firm* — WHDA, LLP

(57) ABSTRACT

A method of manufacturing a glass film using a roll-to-roll process in which a long glass film from a feed roll is wound on a winding roll through a plurality of steps, the plurality of steps comprising: a step of cutting the glass film along a feed direction at a predetermined position in a width direction; and a step of polishing cutting surfaces of glass films into which the glass film is cut.

7 Claims, 9 Drawing Sheets

(56) References Cited

U.S. PATENT DOCUMENTS

| | | | |
|---|---|---|---|
| 2015/0255746 A1* | 9/2015 | Osaki | H10K 50/844 |
| | | | 438/28 |
| 2015/0315059 A1 | 11/2015 | Abramov et al. | |
| 2018/0249579 A1* | 8/2018 | Garner | C03C 17/008 |
| 2019/0047895 A1 | 2/2019 | Kuhn et al. | |
| 2019/0127262 A1 | 5/2019 | Hong et al. | |
| 2019/0152826 A1 | 5/2019 | Ikai et al. | |
| 2019/0185363 A1* | 6/2019 | Kittleson | C03B 33/091 |
| 2019/0292086 A1 | 9/2019 | Murashige et al. | |

FOREIGN PATENT DOCUMENTS

| | | |
|---|---|---|
| JP | 2011-240291 A | 12/2011 |
| JP | 5510650 B2 | 6/2014 |
| JP | 2015-182918 A | 10/2015 |
| JP | 2016-501817 A | 1/2016 |
| JP | 2016-204176 A | 12/2016 |
| JP | 2017-214240 A | 12/2017 |
| KR | 20110092472 A | 8/2011 |
| TW | I616411 B | 3/2018 |
| WO | 2011/111625 A1 | 9/2011 |
| WO | 2014/085357 A1 | 6/2014 |
| WO | 2018/079343 A1 | 5/2018 |

OTHER PUBLICATIONS

Office Action dated Jan. 9, 2024, issued in counterpart JP Application No. 2019-143951, with English translation. (5 pages).

Office Action dated Jun. 27, 2023, issued in counterpart JP Application No. 2019-143951, with English translation. (6 pages).

International Search Report dated Oct. 27, 2020, issued in counterpart International Application No. PCT/ JP2020/029534, w/English translation (6 pages).

Office Action dated Jun. 24, 2024, issued in counterpart to TW Application No. 109126204, with English translation. (12 pages).

Office Action dated Aug. 28, 2024, issued in counterpart KR Application No. 10-2022-7002818, with English translation. (15 pages).

* cited by examiner

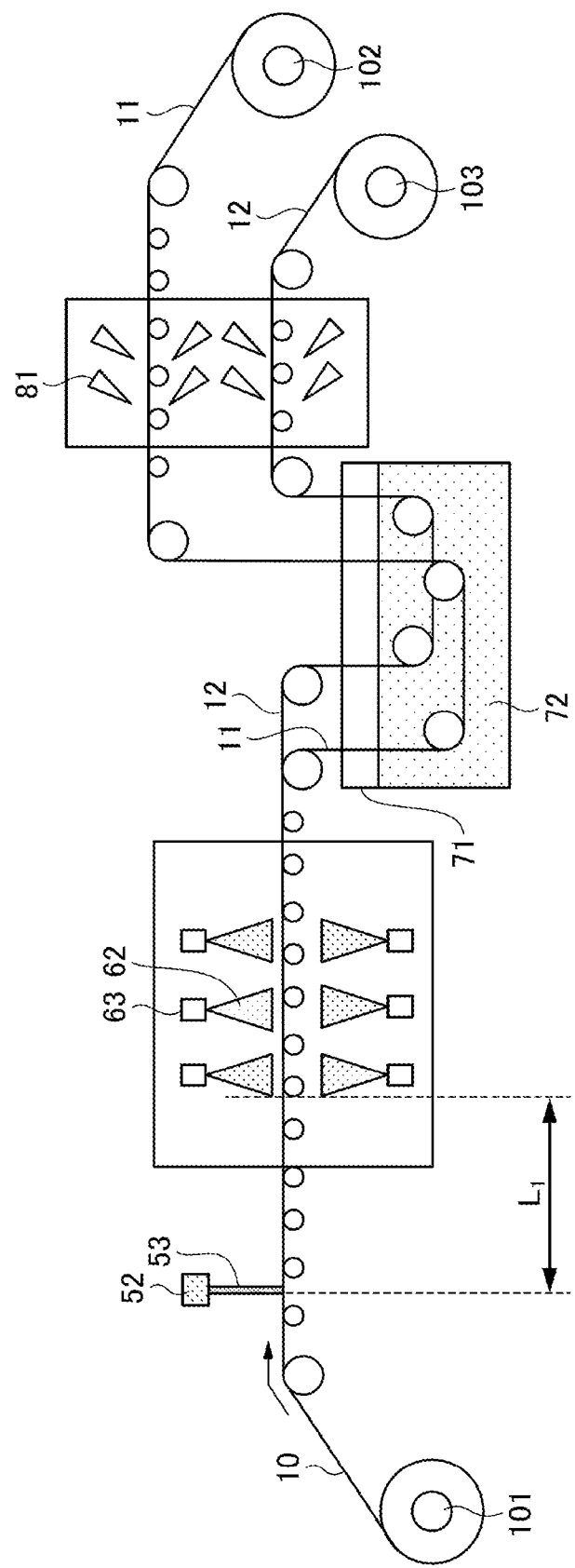

METHOD OF MANUFACTURING GLASS FILM

TECHNICAL FIELD

The invention relates to methods of manufacturing a glass film.

BACKGROUND ART

The maturing of the technology to form a thin glass has been making it possible to form a glass film, i.e., a film made of glass, thereby opening up the possibility of handling a glass film in a shape of a roll. When the glass film can be handled as a roll, the glass film can be continuously processed by using a highly productive roll-to-roll process.

It is preferable to use a roll of glass film that is continuously cut with a blade or the like when the width of devices to be used is limited. If a single roll can be cut into a plurality of rolls, the production efficiency of the rolls will be advantageously increased.

From this point of view, the technology of cutting an unrolled glass film into a plurality of pieces has been studied. However, it is a problem that the cutting surfaces of the cut glass films rub against each other, causing cracks in the glass films, and the glass films are broken when they are wound into a roll.

In consideration of this, the technology has been suggested to separate a glass film by inclining the cutting surfaces of the glass films in a certain direction to avoid interference of the cut glass films (See Patent Literature 1, for example). A technology utilizing a peeling phenomenon has also been suggested, wherein a high-power laser beam is used to cut a glass film while melting it (See Patent Document 2).

CITATION LIST

Patent Document

Patent Document 1: Japanese Patent No. 5510650
Patent Document 2: Japanese Patent Published Application No. 2017-214240

SUMMARY OF INVENTION

Technical Problem

However, in the technology disclosed in Patent Document 1 and the like, continuous and safe control of the cutting surfaces is difficult. It also becomes increasingly difficult to wind a glass film into a roll, as its length increases. In the technology disclosed in Patent Document 2 and the like, rubbing of the cutting surfaces can cause a risk of cracking, resulting in filamentous flakes. How to remove these flakes is a problem and an adequate means has not yet been established.

The invention is made in consideration of the above matters, and it is an object of the present invention to provide a method of manufacturing a glass film that can suppress generation of cracking in the glass films after being cut.

Solution to Problem

A method of manufacturing a glass film uses a roll-to-roll process in which a long glass film from a feed roll is wound on a winding roll through a plurality of steps, wherein the plurality of steps includes a step of cutting the glass film along a feed direction at a predetermined position in a width direction and a step of polishing cutting surfaces of glass films into which the glass film is cut.

Advantageous Effect of Invention

According to the disclosed technology, a method of manufacturing a glass film that can suppress generation of cracking in the cut glass films is provided.

BRIEF DESCRIPTION OF DRAWINGS

FIG. 7 is a drawing illustrating an embodiment of the manufacturing steps of the glass film using a roll-to-roll process.

DESCRIPTION OF EMBODIMENTS

In the following, embodiments of the present invention will be described with reference to the accompanying drawings. In each drawing, the same signs are attached to the same components, and redundant explanations are omitted.
[Glass Film]

Figure 1A:
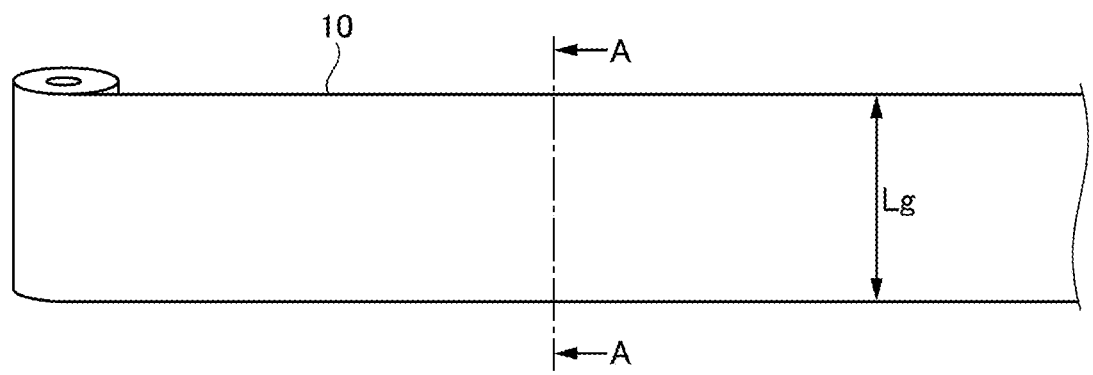
FIG. 1A is a schematic diagram illustrating a glass film to be fed.
Figure 1B:
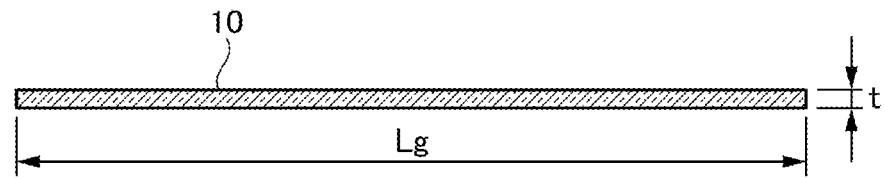
FIG. 1B is a schematic diagram illustrating the glass film to be fed.

A glass film to be fed will be described first. FIG. 1A is a schematic diagram illustrating a glass film to be fed. FIG. 1B is a cross-sectional view illustrating the glass film to be fed, showing the cross section along the line A-A in FIG. 1.

Referring to FIGS. 1A and 1B, a glass film 10 is a long glass film. In this specification, "long" means an elongated shape with a sufficiently long length relative to a width, including, for example, an elongated shape with the length that is ten times or more as long as the width.

The length of the glass film 10 is preferably 50 m or more, more preferably 100 m or more, and even more preferably 500 m or more. The width Lg of the glass film 10 is preferably 100 mm to 5000 mm, and more preferably 200 mm to 3000 mm, and even more preferably 500 mm to 2000 mm. The glass film 10 is provided as a roll.

The glass film 10 is not particularly limited, and one appropriate for the purpose can be used. According to the classification by composition, the glass film 10 can be, for example, soda lime glass, borate glass, aluminosilicate glass, quartz glass, and the like. The content of alkali metal components (e.g., $Na_2O$, $K_2O$, $Li_2O$) in the glass is preferably 15% or less by weight, and more preferably 10% or less by weight.

The thickness t of the glass film 10 is preferably 30 μm to 150 μm, more preferably 50 μm to 140 μm, even more preferably 70 μm to 130 μm, and even more preferably 80 μm to 120 μm. Within such a range, manufacturing with excellent flexibility is possible in the roll-to-roll process. Furthermore, the glass film 10 that is not easily cracked can be obtained with high productivity.

The optical transmittance of the glass film 10 at a wavelength of 550 nm is preferably 85% or more. The refractive index of the glass film 10 at a wavelength of 550 nm is preferably 1.4 to 1.65.

The density of the glass film 10 is preferably 2.3 $g/cm^3$ to 3.0 $g/cm^3$, and even more preferably 2.3 $g/cm^3$ 2.7 $g/cm^3$. Glass films within the above range can provide a glass film 10 that can contribute to the weight reduction of an image display.

Forming methods of a glass film 10 are not particularly limited and a method appropriate for the purpose can be used. Typically, a glass film 10 can be produced by melting a mixture containing a main raw material such as silica or alumina, a defoaming agent such as salt cake or antimony oxide, and a reducing agent such as carbon at a temperature of about 1400° C. to 1600° C.; forming the melted mixture into a thin plate; and then cooling the thin plate. Examples of forming methods of the glass film 10 include a slot down-draw method, a fusion forming process, and a float process. The glass film formed as a plate by these methods may be chemically polished by a solvent such as hydrofluoric acid, if necessary, to make it thinner and smoother.

To prevent parts of the glass film 10 wound into a roll from contacting with each other, a support element such as a resin film or paper can be arranged on the back side of the glass film 10. To avoid generation of cracking in the glass film, a reinforcement such as a resin tape may be provided linearly along the longitudinal direction of the glass film 10 near both ends of the glass film 10 in the width direction on one side of the glass film 10.

[Method of Manufacturing the Glass Film]

Figure 2:
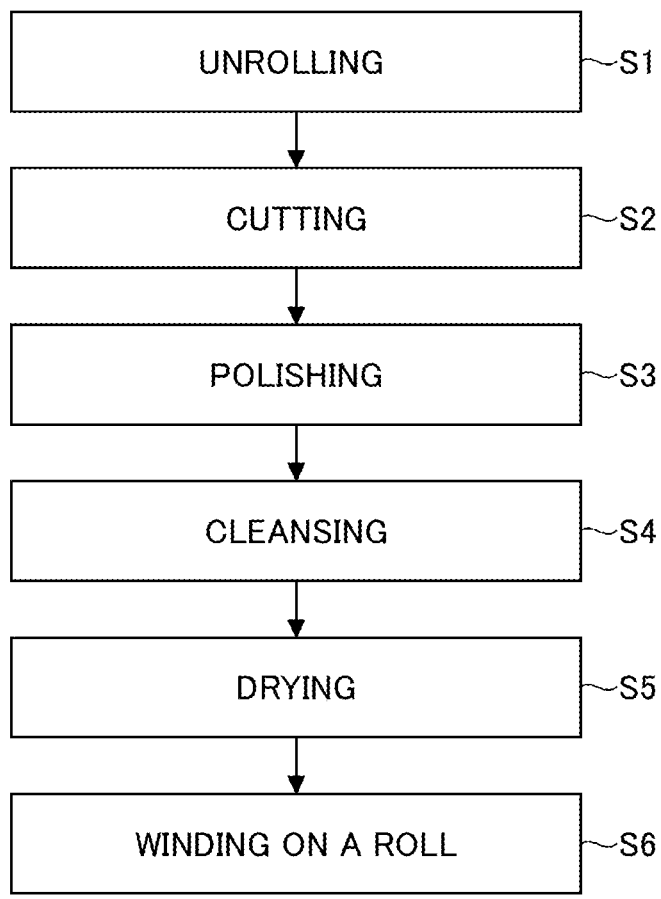
FIG. 2 is a stepwise flow diagram illustrating a method of manufacturing the glass film according to the embodiment.

A method of manufacturing the glass film 10 is described as below. FIG. 2 is a stepwise flow diagram illustrating the method of manufacturing the glass film according to this embodiment. FIGS. 3A through 6B are schematic diagrams illustrating manufacturing steps of the glass film according to this embodiment.

In step S1 (unrolling) shown in FIG. 2, the glass film 10 is unrolled from a feed roll.

Figure 3A:
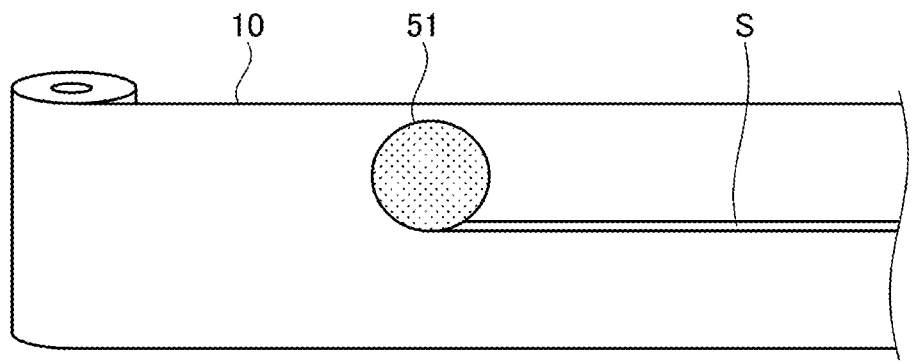
FIG. 3A is a schematic diagram (1) illustrating a step of manufacturing the glass film according to the embodiment.
Figure 3B:
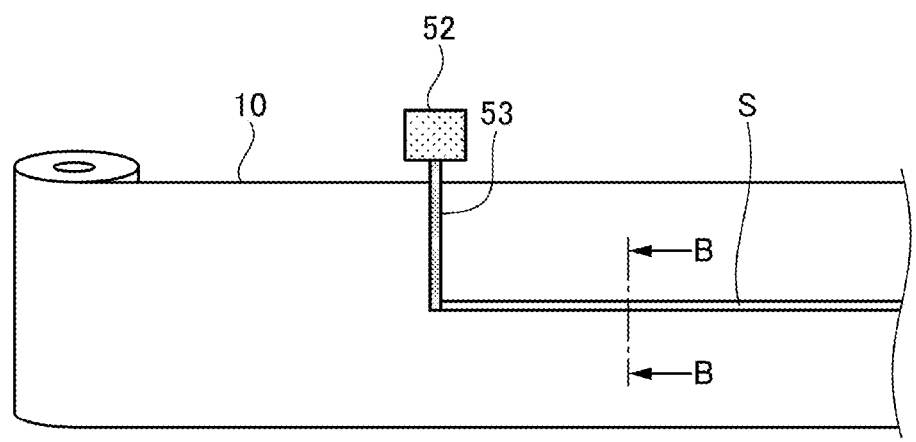
FIG. 3B is a schematic diagram illustrating a step of manufacturing the glass film (2) according to the embodiment.

In step S2 (cutting) shown in FIG. 2, the glass film 10 is cut along a feed direction at a predetermined position in a width direction. Methods of cutting the glass film 10 are not particularly limited, and any method can be selected. Examples of cutting methods include a mechanical cutting method by a scrubber 51, as shown in FIG. 3A, and a thermal cutting method by emitting a laser beam 53 from a laser device 52 at the glass film 10, as shown in FIG. 3B.

For example, a carbon dioxide laser device can be used as a laser device 52. By using a carbon dioxide laser device as a laser device 52, an absorption wavelength of the glass film 10 can be appropriately set and local heating can be performed in a simple and stable manner. The cost can also be reduced.

Cutting by a laser beam is based on a principle that after an initial crack is formed, the crack is heated by a laser to generate thermal stress in the glass, causing the crack to grow. Another method of efficiently generating thermal stress is to spray a mist of water called coolant on a line scanned by a laser beam to effectively generate a temperature difference or stress difference in the glass and cut it. As a way of generating the thermal stress, other methods that enable local heating, such as electrically heated wires or hot air spray, can be used instead of emitting a laser beam.

Figure 3C:
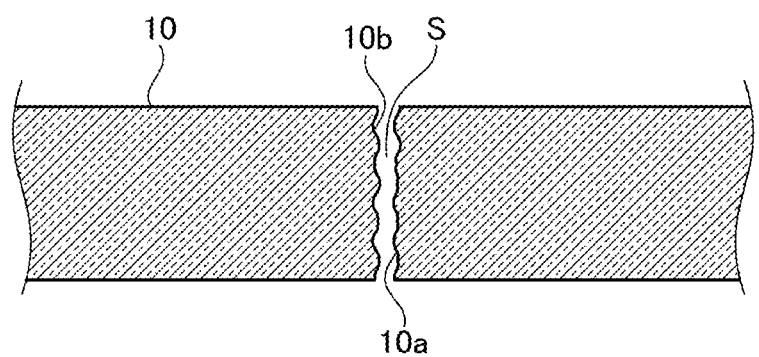
FIG. 3C is a schematic diagram (3) illustrating a step of manufacturing the glass film according to the embodiment.

As shown in FIG. 3C, after being cut, the glass film 10 has cutting surfaces 10a and 10b facing each other, and a slit S is formed between the cutting surface 10a and the cutting surface 10b. However, the slit S is very narrow, so that the cutting surfaces 10a and 10b are almost touching each other. FIG. 3C is a cross-sectional view along the line B-B in FIG. 3B. The cutting surfaces 10a and 10b as well as the slit S shown in FIG. 3C are also formed in the case shown in FIG. 3A.

When a support element such as a resin film or a paper is provided on the back side of the glass film 10, the support element is preferably taken off before step S2 and only the glass film 10 is cut.

Then, in step S3 (polishing) shown in FIG. 2, the cutting surfaces 10a and 10b of the cut glass film 10 are polished. In this step, both end faces, that is, both side surfaces of the glass film 10 are polished along with the cutting surfaces 10a and 10b of the glass film 10.

Methods of polishing the glass film 10 are not particularly limited, and chemical polishing or physical polishing can be used. However, since the physical polishing can damage the glass film if the glass film 10 is thin, chemical polishing without such a risk, that is, etching can be preferably used.

Figure 4A:
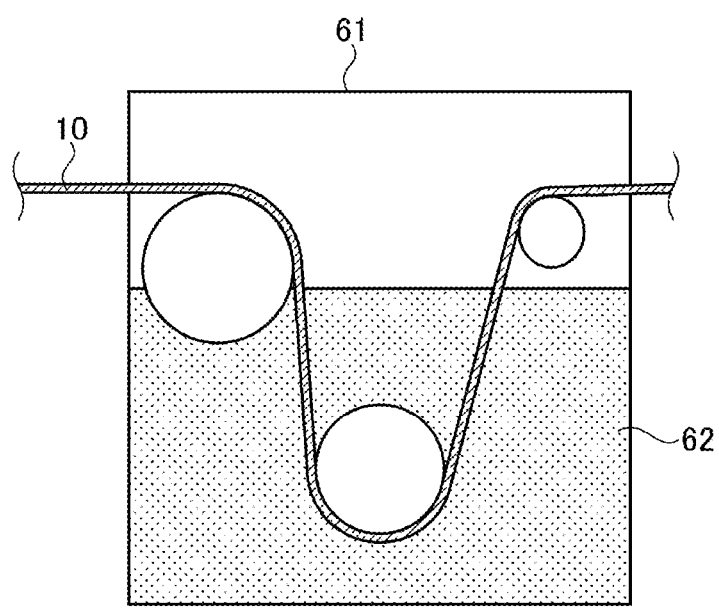
FIG. 4A is a schematic diagram (4) illustrating a step of manufacturing the glass film according to the embodiment.
Figure 4B:
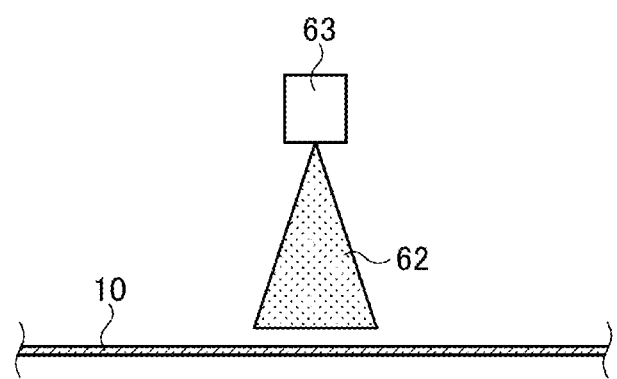
FIG. 4B is a schematic diagram (5) illustrating a step of manufacturing the glass film according to the embodiment.

Examples of chemical polishing methods include, a method of immersing the glass film 10 in a polishing solution 62 inside an etching bath 61, as shown in FIG. 4A, and a method of spraying the polishing solution 62 from a spray device 63, as shown in FIG. 4B.

When the spray device 63 is used, the polishing solution 62 can be sprayed on the entire front side of the glass film 10 or it can be sprayed only near the cutting surfaces 10a and 10b. When using the spray device 63, instead of spraying the polishing solution 62 on the front side of the glass film 10, it may be sprayed on the back side of the glass film 10. It is also possible to spray on both the front side and the back side of the glass film 10. The spray device 63 can include a plurality of spray nozzles to spray the polishing solution 62 equally on the glass film 10.

For example, a solution containing hydrofluoric acid can be used as a polishing solution 62. The polishing solution 62 can contain other acids than hydrofluoric acid. Other acids include hydrochloric acid, sulfuric acid, and nitric acid. The polishing solution 62 can contain an inorganic acid, a surfactant, or the like. When the polishing solution 62 contains hydrofluoric acid, the concentration of hydrofluoric acid is preferably adjusted within the range of 1% to 30% by weight. The higher the concentration of hydrofluoric acid in the polishing solution 62, the faster the etching rate of the glass film 10. Temperature of the polishing solution 62 is preferably adjusted within the range of 35° C. to 45° C. The higher the temperature of the polishing solution 62, the faster the etching rate of the glass film 10.

Figure 4C:
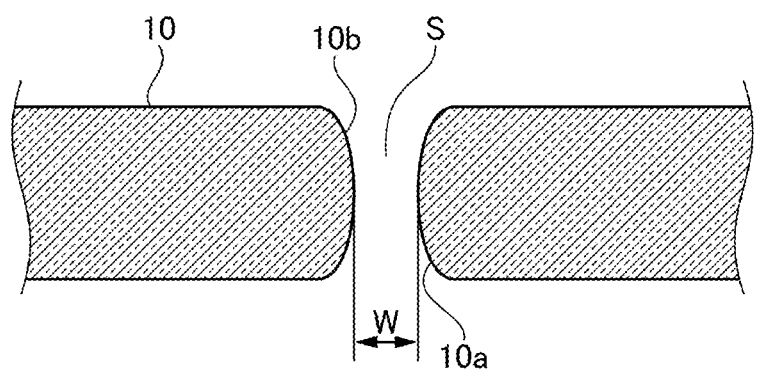
FIG. 4C is a schematic diagram (6) illustrating a step of manufacturing the glass film according to the embodiment.

As shown in FIG. 4C, after polishing, the cutting surfaces 10a and 10b of the glass film 10 are smoother than those shown in FIG. 3C, and the slit S is widened. The width W of the slit S after polishing can be adjusted by a feed speed of the glass film 10, a concentration of the polishing solution 62, a temperature of the polishing solution 62, and a pressure at which the polishing solution 62 is sprayed. The width W of the slit S after polishing is preferably 5 μm or more to avoid contact between the cutting surface 10a and the cutting surface 10b in the processing steps, and 1 mm or less in consideration of etching efficiency. Considering the etching efficiency, the etching rate of glass film 10 is preferably within the range of 0.1 μm/min to 70 μm/min, and even more preferably within the range of 1 μm/min to 30 μm/min. FIG. 4C shows a cross-sectional view corresponding to FIG. 3c.

When a reinforcement such as a resin tape to avoid generation of cracking is provided near both ends of the glass film 10 in the width direction, the areas provided with the reinforcement near both ends of the glass film 10 in the width direction may be also cut and the areas provided with the reinforcement may be removed in step S2. In the polishing process in step S3, both end faces of the glass film are polished along with the cutting surfaces 10a and 10b. As a result, there is no point of origin at which a crack can be generated near both the end faces of the glass film 10, so that the glass film 10 can be handled in the subsequent steps without concern about the generation of cracking even without a reinforcement.

Figure 5A:
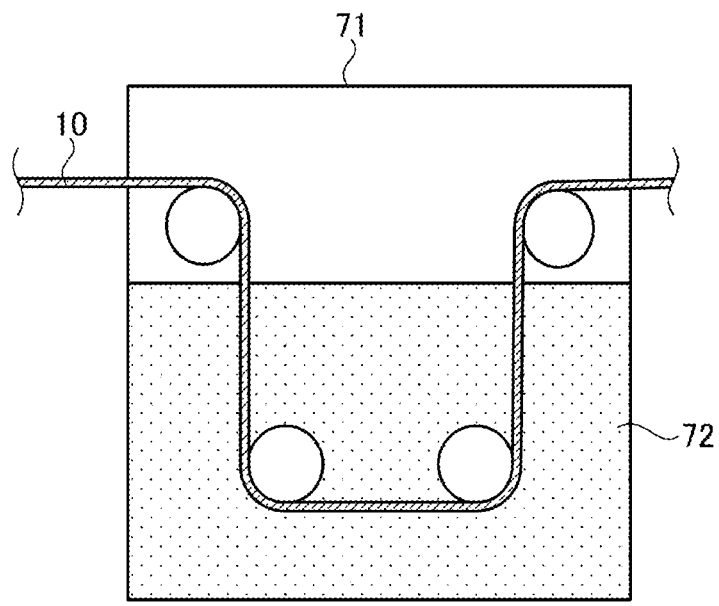
FIG. 5A is a schematic diagram (7) illustrating a step of manufacturing the glass film according to the embodiment.
Figure 5B:
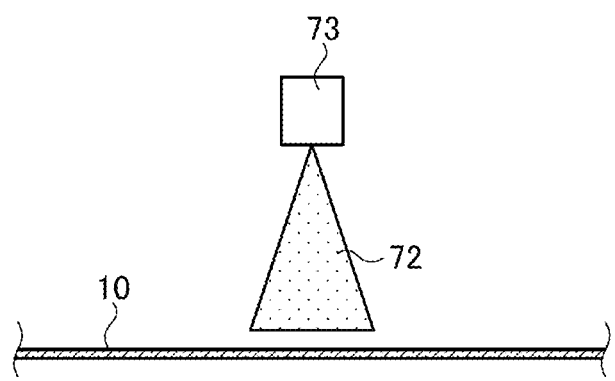
FIG. 5B is a schematic diagram (8) illustrating a step of manufacturing the glass film according to the embodiment.

In step S4 (cleansing) shown in FIG. 2, the polished glass film 10 is cleansed and the polishing solution 62 and other substances adhering to the glass film 10 is removed. Methods of cleansing the glass film 10 are not particularly limited and any method can be selected. Examples of methods of cleansing the glass film 10 include a method of immersing the glass film 10 in a cleansing solution 72 inside a cleansing bath 71, as shown in FIG. 5A, and a method of spraying the cleansing solution 72 from a spray device 73, as shown in FIG. 5B. Methods can be freely combined. Examples of this method include, a method including the first cleansing step in which rough cleansing of the polishing solution is performed, and the second cleansing step in which thorough cleansing is performed. The cleansing solution 72 is, for example, water.

Figure 6A:
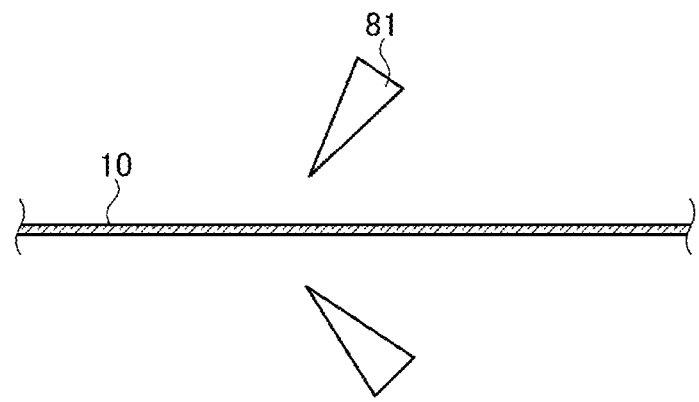
FIG. 6A is a schematic diagram (9) illustrating a step of manufacturing the glass film according to the embodiment.
Figure 6B:
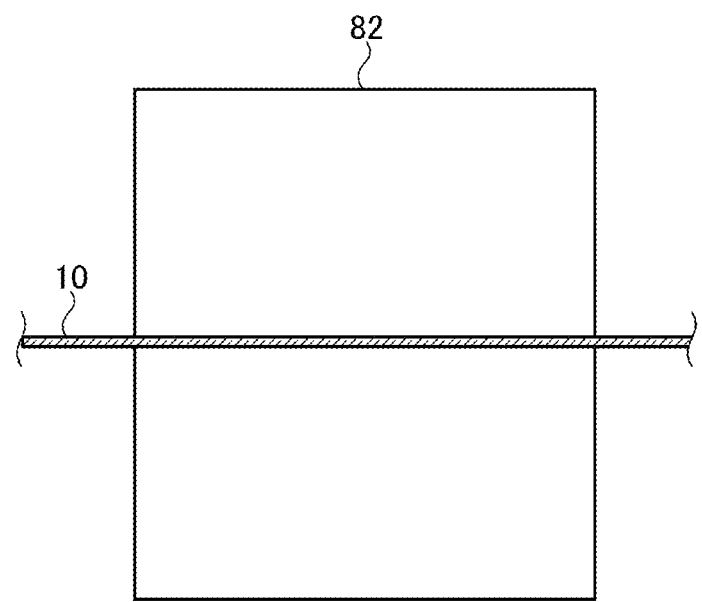
FIG. 6B is a schematic diagram (10) illustrating a step of manufacturing the glass film according to the embodiment.

Then, in step S5 (drying), the cleansing solution adhering to the glass film 10 is dried. Methods of drying the glass film 10 are not particularly limited, and any method can be selected. Examples of Methods of drying the glass film 10 include a method using an air blower 81, as shown in FIG. 6A and a method using an oven 82, as shown in FIG. 6B.

Subsequently, in step S6 (Winding on a roll), as shown in FIG. 2, the cut glass film 10 is wound on another winding roll. In the steps described above, a method of manufacturing the glass film using a roll-to-roll process can be realized, wherein a long glass film from a feed roll is wound on a winding roll through a number of steps. The plurality of steps includes a cutting step and a polishing step, which enables stable manufacturing of a plurality of glass films wound on the roll by cutting the glass film 10.

An example of more specific manufacturing steps to manufacture a plurality of glass films wound on a roll by cutting a glass film is described. FIG. 7 shows an example of manufacturing steps of a glass film using a roll-to-roll process.

As shown in FIG. 7, the described steps in reference to FIG. 2 to FIG. 6B are combined, so that the glass film 10 can be cut in the roll-to-roll process. However, the manufacturing steps of the glass film 10 can have steps other than those described in reference to FIG. 2 to FIG. 6B, if needed.

In an apparatus for manufacturing, the glass film 10, a feed roll 101 as well as winding rolls 102 and 103 are equipped with respective drive motors (not shown). These drive motors are controlled by a control unit (not shown) to be rotated at a predetermined rotation speed in a predetermined rotation direction. This allows the glass film 10 from the feed roll 101 to be wound on the winding rolls 102 and 102 through the plurality of the steps, and to be fed in the roll-to-roll process.

Specifically, the glass film 10 is unrolled from the feed roll 101, fed in a direction indicated by an arrow, and then cut by a laser beam 53 emitted from a laser device 52 arranged on the front side of the film. For example, by fixing the laser device 52 and feeding the glass film 10 in the direction indicated by the arrow, the glass film 10 can be continuously cut at a predetermined position in the width direction along the feed direction. A predetermined position in the width direction is, for example, the center position in the width direction, but is not limited thereto. The glass film 10 after being cut is referred to as a glass film 11 and a glass film 12.

The glass films 11 and 12 are chemically polished by the polishing solution 62 sprayed from the spray device 63 arranged on the front side and the back side of the glass films 11 and 12. After polishing, the cutting surfaces of the glass film 10 appear as a smoothly polished surface, and the slit with a predetermined width is formed (in the same way as in FIG. 4C).

After the polishing step, the glass film 11 and glass film 12 are preferably fed at different positions in a height direction (vertical direction). The glass film 11 and the glass film 12 are separated by a slit with a predetermined width, and both cutting surfaces are essentially not in contact with each other after being polished. By feeding the glass film 11 and the glass film 12 at the different positions in the height direction, it is possible to more reliably avoid contact between the cutting surfaces of the glass film 11 and the glass film 12 after being polished due to vibration etc. during the feeding.

The glass films 11 and 12 fed at the different positions in the height direction, are then immersed in a cleansing solution 72 inside a cleansing bath 71 and cleansed. Subsequently, the cleansed glass films 11 and 12 are dried by an air blower 81. Then, the glass film 11 is wound on the winding roll 102, and the glass film 12 is wound on the winding roll 103.

In this way, the long glass film 10 from the feed roll 101 is wound on the winding rolls 102 and 103 into the cut glass films 11 and 12 through the plurality of steps.

In the manufacturing step of the glass film 10 shown in FIG. 7, the distance $L_1$ between a cutting start position of the glass film 10 and a polishing start position of the glass films 11 and 12 is preferably 0.5 m or more. This can prevent the polishing solution used in the polishing step from having an adverse effect, such as corrosion on the devices used in the cutting step (e.g., a scrubber 51 and a laser device 52).

However, the polishing step preferably follows the cutting step as soon as possible to avoid contact between the cutting surfaces. From this viewpoint, the distance $L_1$ between the cutting start position of the glass film 10 and the polishing start position of the glass films 11 and 12 is preferably 5 m or less, more preferably 3 m or less.

The method of manufacturing the glass film according to this embodiment includes a step of polishing the cutting surfaces of glass films into which the glass film is cut, after the step of continuously cutting the glass film at a predetermined position in the width direction along the feed direction. This can suppress generation of cracking caused by the contact of the cutting surfaces.

Figure 8:
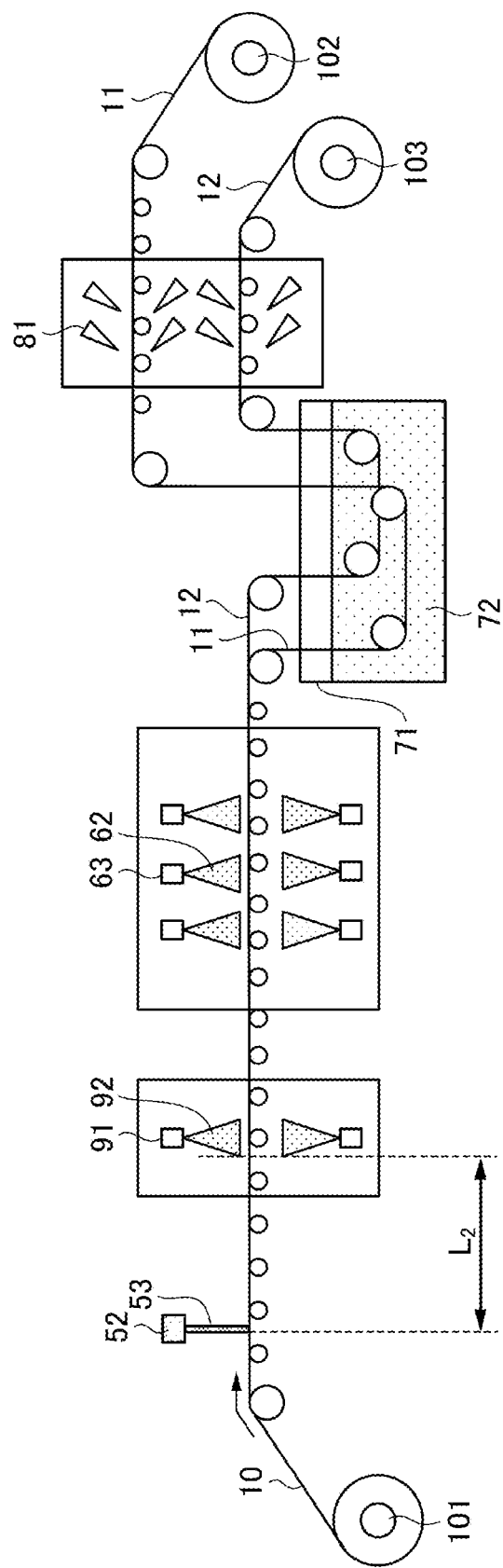
FIG. 8 is a drawing illustrating another embodiment of the steps of manufacturing the glass film using the roll-to-roll process.

FIG. 8 shows another example of manufacturing steps of a glass film using a roll-to-roll process. The manufacturing steps of the glass film 10 shown in FIG. 8 differs from the manufacturing steps of the glass film 10 shown in FIG. 7 in that, as a step that follows the cutting step, it includes a step of cleansing the cut glass film 10 between the cutting step and the polishing step. The step of cleansing the cut glass film is realized by the method of spraying a cleansing solution 92 from a spray device 91. The cleansing solution 92 is, for example, water.

In the manufacturing steps of the glass film 10 shown in FIG. 8, the distance $L_2$ between the cutting start position of the glass film 10 and the cleansing start position of the glass films 11 and 12 is preferably 0.5 m or more. This can prevent the cleansing solution used in the cleansing step from having an adverse effect, such as corrosion on the devices used in the cutting step (e.g., a scrubber 51 and a laser device 52).

However, the polishing step preferably follows the cutting step as soon as possible to avoid contact between cutting surfaces. From this viewpoint, the distance between the cutting start position of the glass film 10 and the polishing start position of the glass films 11 and 12 is preferably 5 m or less, more preferably, 3 m or less, as in FIG. 7, even though a step of cleansing the cut glass film 10 is added between the cutting step and the polishing step.

In this way, as a step that follows the cutting step, the step of cleansing the cutting surfaces of the cut glass films 10 can be placed between the cutting step and the polishing step. Then, a foreign substance (particularly, a resins-based substance) generated before and after the cutting step can be removed. Thereby, problems such as polishing failure caused by a slow progress of the polishing due to foreign substances or cleansing failure caused by insufficient cleansing of hydrofluoric acid that is absorbed by the foreign substances and not fully removed, can be avoided.

Preferred embodiments are described in detail. Further, the present invention is not limited to these embodiments, but various modifications and replacements may be made without departing from the scope of the present invention.

For example, a glass film can be cut into three or more glass films.

The present application is based on and claims priority to Japanese patent application No. 2019-143951 filed on Aug. 5, 2019 with the Japanese Patent Office, the entire contents of which are hereby incorporated by reference.

REFERENCE SIGNS LIST 10, 11, 12 glass film
10a, 10b cutting surface
51 scrubber
52 laser device
53 laser beam
61 etching bath
62 polishing solution
63 spray device
71 cleansing bath
72, 92 cleansing solution
73, 93 spray device
81 air blower
82 oven
101 feed roll
102, 103 winding roll

What is claimed is:

1. A method of manufacturing a glass film using a roll-to-roll process in which a long glass film from a feed roll is wound on a plurality of winding rolls through a plurality of steps, the plurality of steps comprising:
   a step of cutting the glass film along a feed direction at a predetermined position in a width direction into a first cut glass film and a second cut glass film;
   a step of cleansing the first cut glass film and the second cut glass film;
   a step of polishing cutting surfaces of the first cut glass film and cutting surfaces of the second cut glass film after the step of cleansing; and
   a step of respectively winding the first cut glass film and the second cut glass film on a first winding roll and a second winding roll of the plurality of winding rolls, wherein the first winding roll is different from the second winding roll;
   wherein the first cut glass film and the second cut glass film are respectively conveyed via a first path and a second path in a cleansing tank configured to perform the step of cleansing, and a height of the first path is different from a height of the second path; and
   wherein a slit is formed between the first cut glass film and the second cut glass film, and a width of the slit is controlled during the step of polishing before respectively conveying the first cut glass film and the second cut glass film via the first path and the second path.

2. The method of manufacturing the glass film according to claim 1,
   wherein a distance between a cutting start position of the glass film and a polishing start position of the first cut glass film and the second cut glass film is 0.5 m or more.

3. The method of manufacturing the glass film according to claim 1, wherein a distance between a cutting start position of the glass film and a cleansing start position of the first cut glass film and the second cut glass film is 0.5 m or more.

4. The method of manufacturing the glass film according to claim 1, wherein chemical polishing is used in the polishing step.

5. The method of manufacturing the glass film according to claim 4, wherein a polishing solution containing hydrofluoric acid is used in the chemical polishing.

6. The method of manufacturing the glass film according to claim 1, wherein a reinforcement is provided linearly along a longitudinal direction of the glass film near both ends of the glass film in the width direction on one side of the glass film, and areas provided with the reinforcement are removed in the cutting step.

7. The method of manufacturing the glass film according to claim 1, wherein the thickness of the glass film is greater than or equal to 30 µm and less than or equal to 150 µm.

* * * * *